United States Patent [19]

Stolz

[11] 3,962,754
[45] June 15, 1976

[54] PLATE CONNECTORS FOR BELTS

[75] Inventor: Hermann Stolz, Muhlheim am Main, Germany

[73] Assignee: MATO Maschinen-und Metallwarenfabrik Curt Matthaei GmbH & Co. KG, Offenbach, Germany

[22] Filed: May 23, 1974

[21] Appl. No.: 472,516

[30] Foreign Application Priority Data

June 1, 1973 Germany............................ 2327979

[52] U.S. Cl. .............................. 24/33 B; 74/231 J
[51] Int. Cl.² ............................................ F16G 3/02
[58] Field of Search ............... 24/31 H, 33 B, 31 R, 24/33 R, 201 LP, 31 C, 31 W, 31 B, 31 V, 33 P; 274/231 J; 74/231 J

[56] References Cited
UNITED STATES PATENTS

| 982,374 | 1/1911 | Linderman ........................ 24/33 B |
| 1,094,131 | 4/1914 | Diamond ........................... 24/33 B |
| 1,137,409 | 4/1915 | Linderman ........................ 24/33 B |
| 2,005,979 | 6/1935 | Milnes ............................... 24/33 B |
| 2,272,527 | 2/1942 | Koester ............................. 24/33 B |
| 2,666,241 | 1/1954 | Hall, Sr. ............................ 24/31 H |
| 2,751,065 | 6/1956 | Thomson .......................... 74/231 J |
| 3,744,095 | 7/1973 | Tomlinson ........................ 74/231 J |

FOREIGN PATENTS OR APPLICATIONS

| 109,396 | 12/1939 | Australia ........................... 24/33 P |
| 1,271,657 | 8/1961 | France .............................. 74/231 J |
| 1,186,698 | 2/1965 | Germany ........................... 24/33 B |
| 1,185,034 | 3/1970 | United Kingdom ................ 24/33 B |

Primary Examiner—Donald A. Griffin
Attorney, Agent, or Firm—W. G. Fasse; W. W. Roberts

[57] ABSTRACT

A plate connector for joining the ends of a conveyor belt has a pair of connector legs adapted to be affixed to opposite sides of the end of the conveyor belt, and a pair of U-shaped eyes joining the connector legs and adapted to extend from the end of the belt for connection to a similar member affixed to the opposite end of the belt. The connector eyes, in the region through which coupling rods extend, have cross sections with straight base lines and triangular upper edges joining the side edges thereof. The appexes of the triangular cross section areas may be arcuate.

3 Claims, 4 Drawing Figures

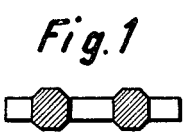
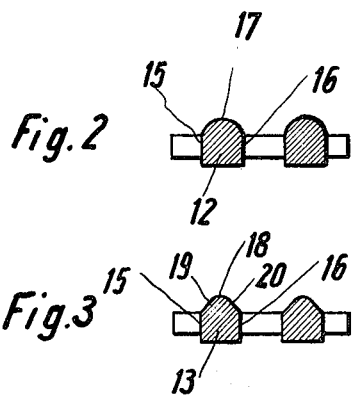
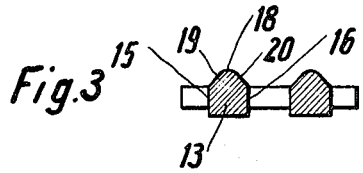
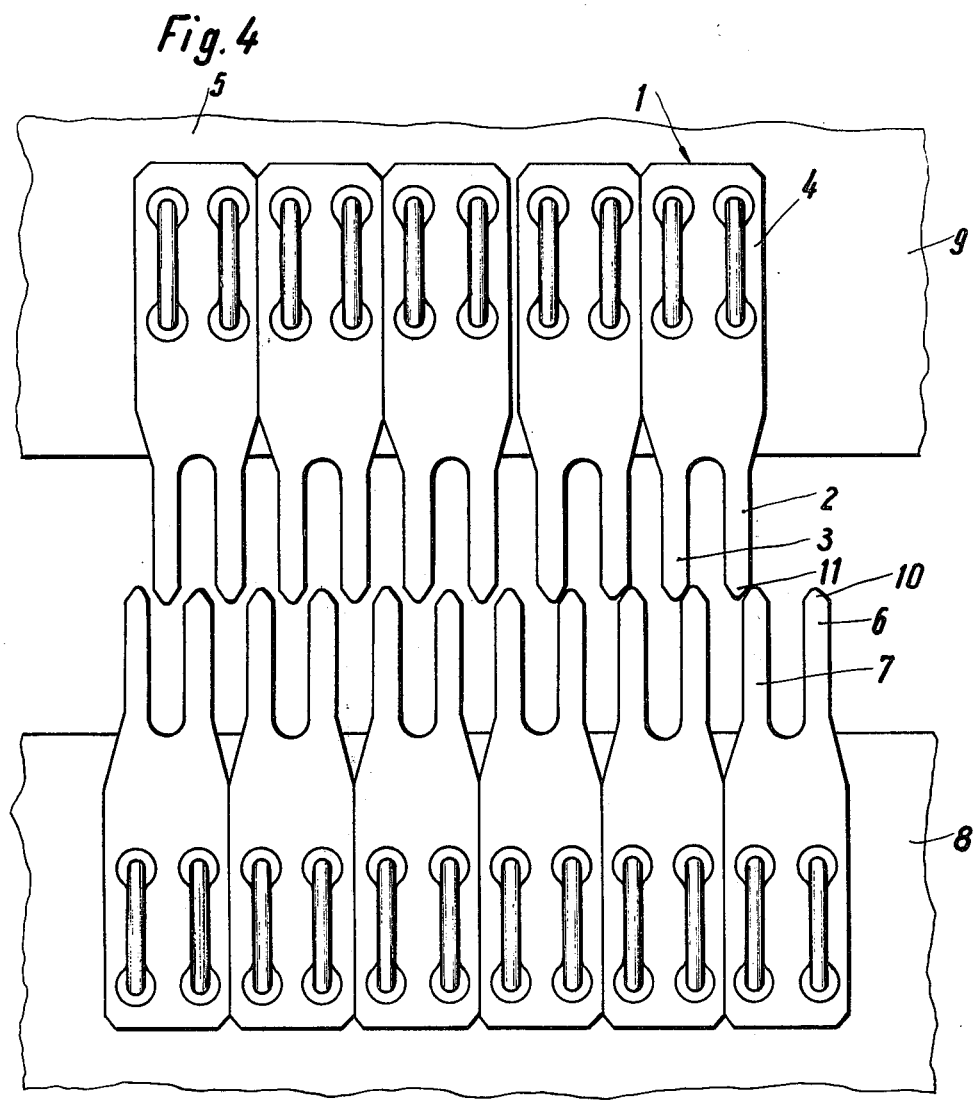

PLATE CONNECTORS FOR BELTS

The invention relates to plate connectors for joining the ends of a conveyor belt, and to a method for the production of such plate connectors or the like.

In the production of plate connectors for conveyor belts or the like, where the connector eyes have a greater material thickness than the connector legs, it is already known to produce the greater material thickness by displacement of the material which otherwise has to be removed for the production of the eye crosspieces.

The formation of the connector eyes which are produced by this known method, for example, as disclosed in German Auslegeschrift No. 1,186,698, posesses the disadvantage that on the occurrence of spacing errors the coupling of the connector sides involves considerable difficulties, because even with small deviations of spacing the two ends of mutually opposite connector eyes abut flatly against one another. Coupling of the plate connectors is then no longer possible, because the connector eyes are inflexible. For this reason in the known plate connectors of the stated kind it is usual to provide a relatively wide clearance between individual connecting elements, which however has a disadvantageous effect upon the available eye cross-section which alone determines the transmittable force. Therefore the invention is directed to the problem of providing plate connectors which can be coupled comparatively easily even if faults occur in the spacing in the pressing of the plate connectors into the carrier belt, or if, in the pressing in of the connection, the belts have stretched transversely. At the same time a wide formation of the eye crosspieces is sought, so that they rest with a wide supporting surface on the coupling rods.

To solve this problem according to the invention in the production of the connector eyes the flow of material in the displacement of the material is guided in such a way that the connector eyes, at least in the region of the coupling rods, have a cross-section with a base line which is a straight line and with an upper edge defining a line which falls away symmetrically towards the two side edge defining lines.

Thus an asymmetric formation of the eye cross-section is achieved with the supporting surface on the coupling rod flat while the opposite outwardly facing surface of the eye crosspiece has guide faces which render possible sliding of the connector halves into one another in coupling, even in the case of deviations of spacing of the connection halves to be coupled.

The connector eyes may be arcuate or roof-shaped in cross-section and they are rounded off at the point of connection of the two meeting oblique surfaces.

BRIEF FIGURE DESCRIPTION

The invention will be described in greater detail hereinafter by reference to embodiments which are illustrated in the accompanying drawins wherein:

FIG. 1 shows a sectional view through a connector eye of conventional type;

FIG. 2 shows a sectional view through a connector eye of a connector according to the invention with partially arcuate cross-section;

FIG. 3 shows a sectional view through another connector eye of a connector according to the invention with a partially roof-shaped cross-section, and FIG. 4 shows a plan view of the ends of two conveyor belts with plate connectors according to the invention serving for connection and arranged thereon.

DETAILED DESCRIPTION OF EXAMPLE EMBODIMENTS

Each plate connector 1 (FIG. 4) has U-shaped connector eyes 2 and 3 and connector legs 4 connected in one piece therewith, which rest on the upper and under sides of the conveyor belts 5 and are securely fastened thereto. Several plate connectors 1 are here provided over the entire width of the belt 5 in such a way that connector eyes 6 and 7 of similar plate connectors on the opposite belt end 8 fit into the respective gaps between the connector eyes 2 and 3, the belt 5 is secured to the belt end 8 by a coupling rod (not shown) which is pushed through the connector eyes 2,3 and 6,7 after these have been pushed together completely.

The two belt ends 8 and 9 can easily be coupled when the connector eyes in each case lie opposite to gaps. As soon as this is not the case for any reason, as for example in the case of the plate connectors 1 situated on the right side of FIG. 4, the connector eye ends abut one another with their crosspieces 10 and 11. If the cross-section of the crosspieces 10 and 11 possesses the form shown in FIG. 1, coupling of the two belt ends 8 and 9 is rendered extraordinarily difficult. For this reason it is advantageous if the connector eyes 2, 3 and 6, 7 possess a cross-section as shown in FIG. 2 or 3 at least in the region of the coupling rod. By the partially arcuate or roof-shaped conformation of the connector eyes or their crosspieces, guide end faces are produced which facilitate the pushing together of the connector eyes not lying opposite to gaps.

The connector eyes 12, 13 according to the invention have in cross-section, at least in the region of the coupling rod, a straight base line 14 and an upper edge defining line 17 or 18 falling away towards side edge defining lines 15, 16. The defining line 17 is arcuate while the defining line 18 is roof-shaped and forms an open triangle with a rounded-off apex between the sides 19 and 20. The arcuate or roof-shaped conformation of the cross-section of the connector eyes 12 or 13 respectively produces the already mentioned guide end faces which permit simpler coupling in the case of spacing errors.

The cross-sectional form according to the invention can be limited to the crosspiece of the connector eyes, but this is not absolutely necessary because the connector eyes can also be laid upon one another in overlapped manner and then place themselves side by side in the desired manner on pushing in of the coupling rod.

What is claimed is:

1. In a connector for interconnecting the two opposite ends of a belt, wherein the connector has a plurality of connector members, each connector member having a pair of connector legs adapted to be secured to one of said two opposite ends of said belt and a U-shaped eye joining the two connector legs, said U-shaped eye being dimensioned to extend beyond the end of the belt, whereby the two ends of the belt may be joined by a connector rod extending transversely of the belt through the eyes of a plurality of said connector members secured to each of the two ends of the belt; the improvement wherein the cross-section through each eye in the region thereof through which the connector rod is adapted to extend, has an inwardly facing base surface which is straight in the plane of said cross-section, said base surface being curved in a plane extending at a right angle to said sectional plane and longitudinally to said belt, said inwardly facing base surface extending straight over the width of the eye to provide a wide surface contact between said base surface and a connector rod, each eye further having an outwardly facing surface opposite said base surface, which outwardly facing surface is so curved in said sectional plane and in said plane extending perpendicularly to said sectional plane, that the outwardly facing curved surface merges smoothly into the sides of its eye to allow opposite eyes to be readily guided into intermeshing by applying opposite longitudinal forces to the ends of the belt, and means for securing said connector legs to the respective belt end to form troughs between adjacent eyes to allow said intermeshing of said eyes, even when the opposed eyes and the opposite troughs between said eyes are slightly misaligned.

2. The connector of claim 1, wherein said outwardly facing curved surface includes slanted surface sections merging into the sides of its eye.

3. The connector of claim 1, wherein said means for securing said connector legs to the respective belt ends comprise plate means, each of which combines a pair of said U-shaped eyes, said plate means being so shaped as to form said troughs between adjacent eyes.

* * * * *